(12) United States Patent
Lin

(10) Patent No.: US 6,474,920 B2
(45) Date of Patent: Nov. 5, 2002

(54) SANDWICH TYPE EXPANSION BOLT

(75) Inventor: Richard F. S. Lin, Taipei (TW)

(73) Assignee: Shiney G&M Associated Co., LTD, Taipei (TW)

( * ) Notice: Subject to any disclaimer, the term of this patent is extended or adjusted under 35 U.S.C. 154(b) by 0 days.

(21) Appl. No.: 09/796,624

(22) Filed: Mar. 2, 2001

(65) Prior Publication Data

US 2002/0122712 A1 Sep. 5, 2002

(51) Int. Cl.[7] .................................................. F16B 35/02
(52) U.S. Cl. .......................................... 411/385; 411/45
(58) Field of Search .......................... 411/15, 45, 57.1, 411/58, 63, 76, 418, 419, 385, 383, 384, 433

(56) References Cited

U.S. PATENT DOCUMENTS

| | | | | |
|---|---|---|---|---|
| 1,087,759 A | * | 2/1914 | Gould | |
| 2,352,297 A | * | 6/1944 | Wales | |
| 2,693,732 A | * | 11/1954 | Durst | |
| 2,836,095 A | * | 5/1958 | Devine | |
| 2,892,376 A | * | 6/1959 | Schonfeld | |
| 3,096,679 A | * | 7/1963 | Jones | |
| 4,478,546 A | * | 10/1984 | Mercer | |
| 5,090,857 A | * | 2/1992 | Dunn | |

* cited by examiner

Primary Examiner—Flemming Saether
(74) Attorney, Agent, or Firm—Bacon & Thomas, PLLC

(57) ABSTRACT

An expansion bolt includes two symmetrical bolt halves. The bolt halves each includes an inner side, an outer side, a front face, a rear face, and outer threads are provided at the outer side for the mounting of a nut thereon. An insert block inserted in between the bolt halves after the bolt halves have been attached together and inserted into a hole on an object. A nut is threaded onto the outer threads of the bolt halves to secure the bolt halves to the hole of the object into which the bolt halves are inserted.

4 Claims, 5 Drawing Sheets

SANDWICH TYPE EXPANSION BOLT

BACKGROUND OF THE INVENTION

The present invention relates to expansion bolts and, more specifically, to a sandwich type expansion bolt, which comprises two bolt halves with an insert block sandwiched in therebetween, and a nut threaded onto the bolt halves to secure the bolt halves to the hole of the object into which the bolt halves are inserted.

PRIOR ART OF THE INVENTION

A regular expansion bolt, as shown in FIG. 1, comprises a socket 1, a screw bolt 2 threaded into the socket 1. The socket 1 has an internally threaded body 10, and a split 12 in the expanded rear end thereof. After insertion of the socket 1 into a hole in an object 3, the threaded shank 20 of the screw rod 2 is threaded into the internally threaded body 10 of the socket 1 to expand the split rear end of the socket 1, causing the socket 1 to be firmly secured to the object. This structure of expansion bolt can only support a small object that has less gravity weight. If the expansion bolt is used to support a heavy object, for example, a stone material on the outside wall of a building, the object may fall from the socket 1 and the screw bolt 2 to hit passers-by accidentally.

SUMMARY OF THE INVENTION

The present invention has been accomplished to provide a sandwich type expansion bolt, which eliminates the aforesaid problem. According to one aspect of the present invention, the expansion bolt comprises two symmetrical bolt halves, the bolt halves each having an inner side, and outer side, a front end, a rear end, and outer threads provided at the outer side for the mounting of a nut, an insert block inserted in between the bolt halves after the bolt halves have been attached together and inserted into a hole on an object, and a nut threaded onto the outer threads of the bolt halves to secure the bolt halves to the hole of the object into which the bolt halves are inserted. According to another aspect of the present invention, positioning means is provided to prevent the insert block from falling out of the bolt halves.

DETAILED DESCRIPTION OF THE PREFERRED EMBODIMENT

Figure 1:
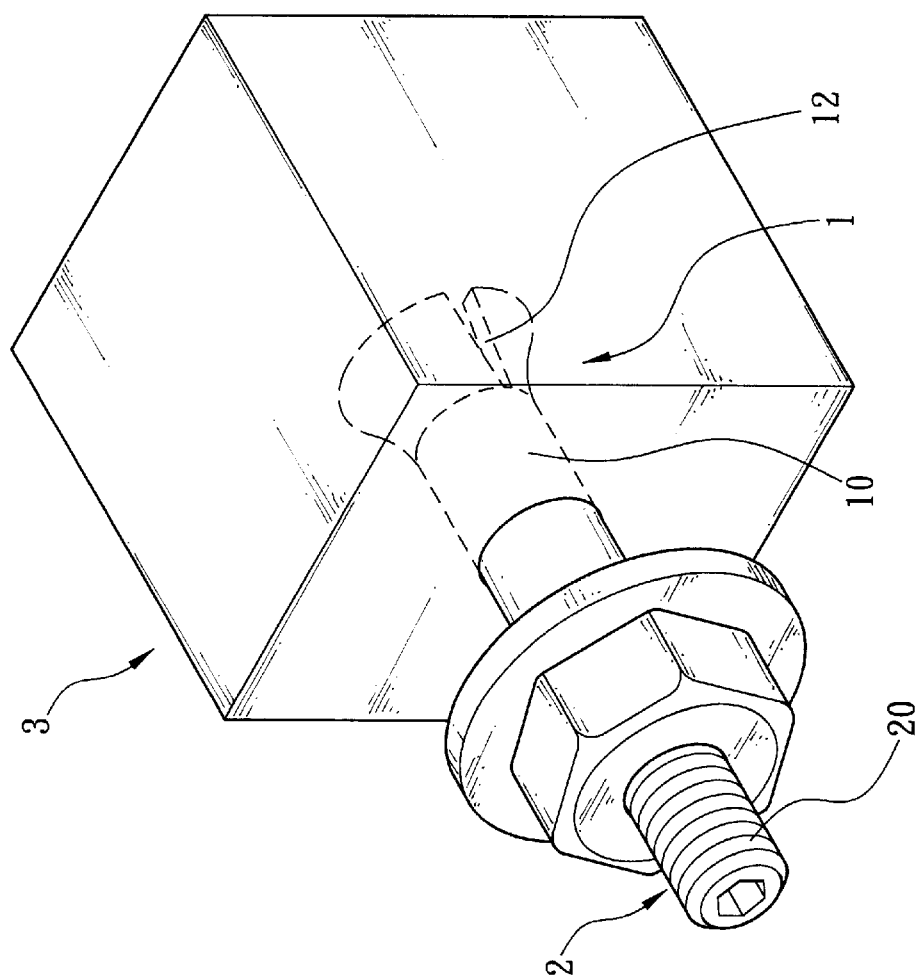
FIG. 1 is a perspective view showing an expansion bolt installed in an object according to the prior art.
Figure 3:
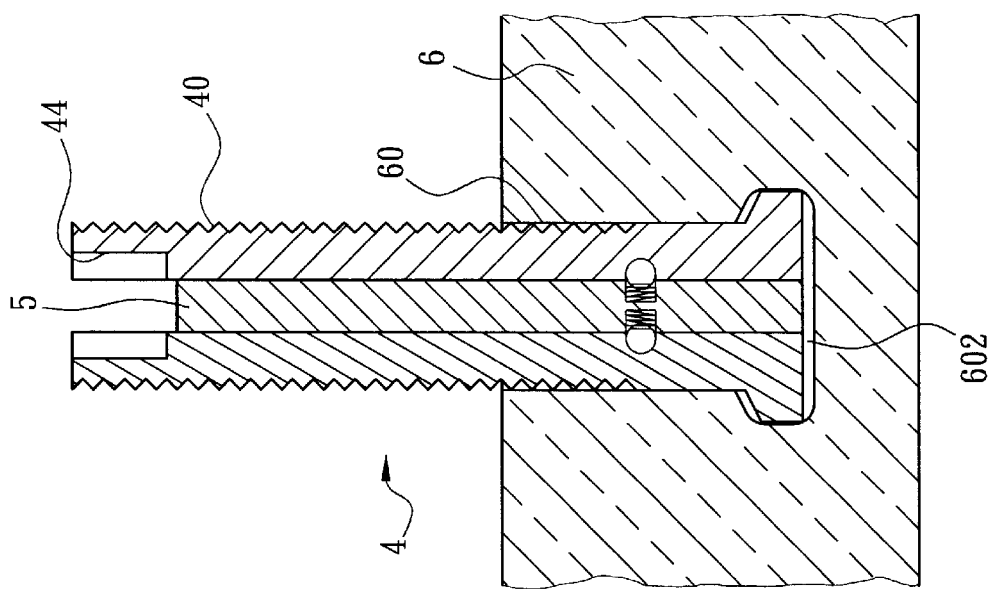
FIG. 3 is a sectional view showing the expansion bolt of the first embodiment of the present invention installed in an object (before the mounting of the nut on the bolt halves).
Figure 2:
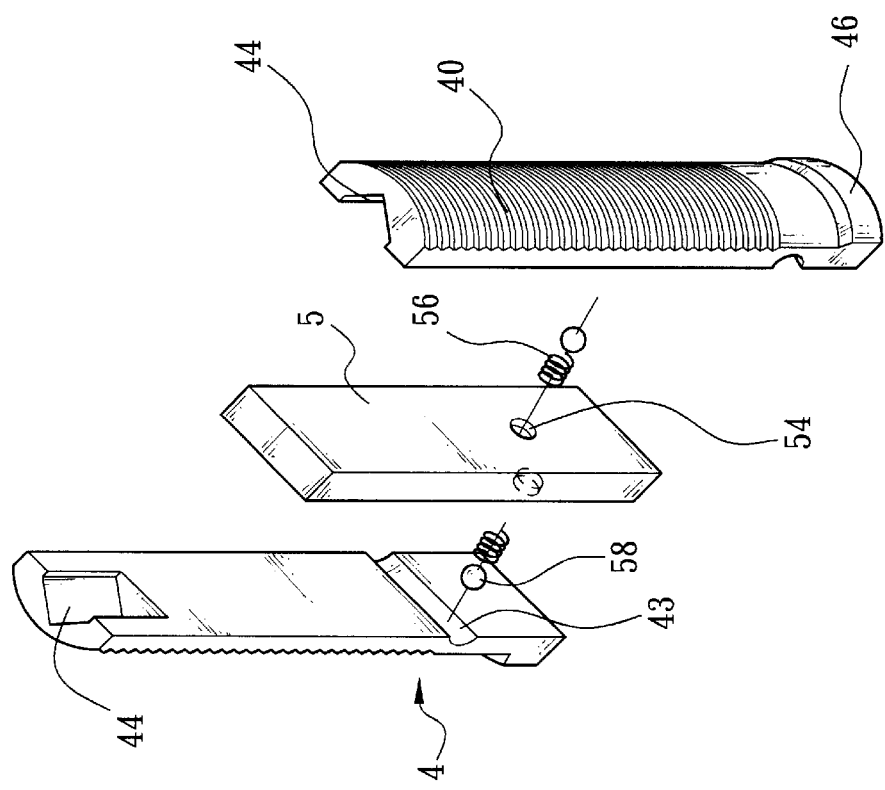
FIG. 2 is an exploded view of an expansion bolt according to a first embodiment of the present invention (the nut excluded).
Figure 7:
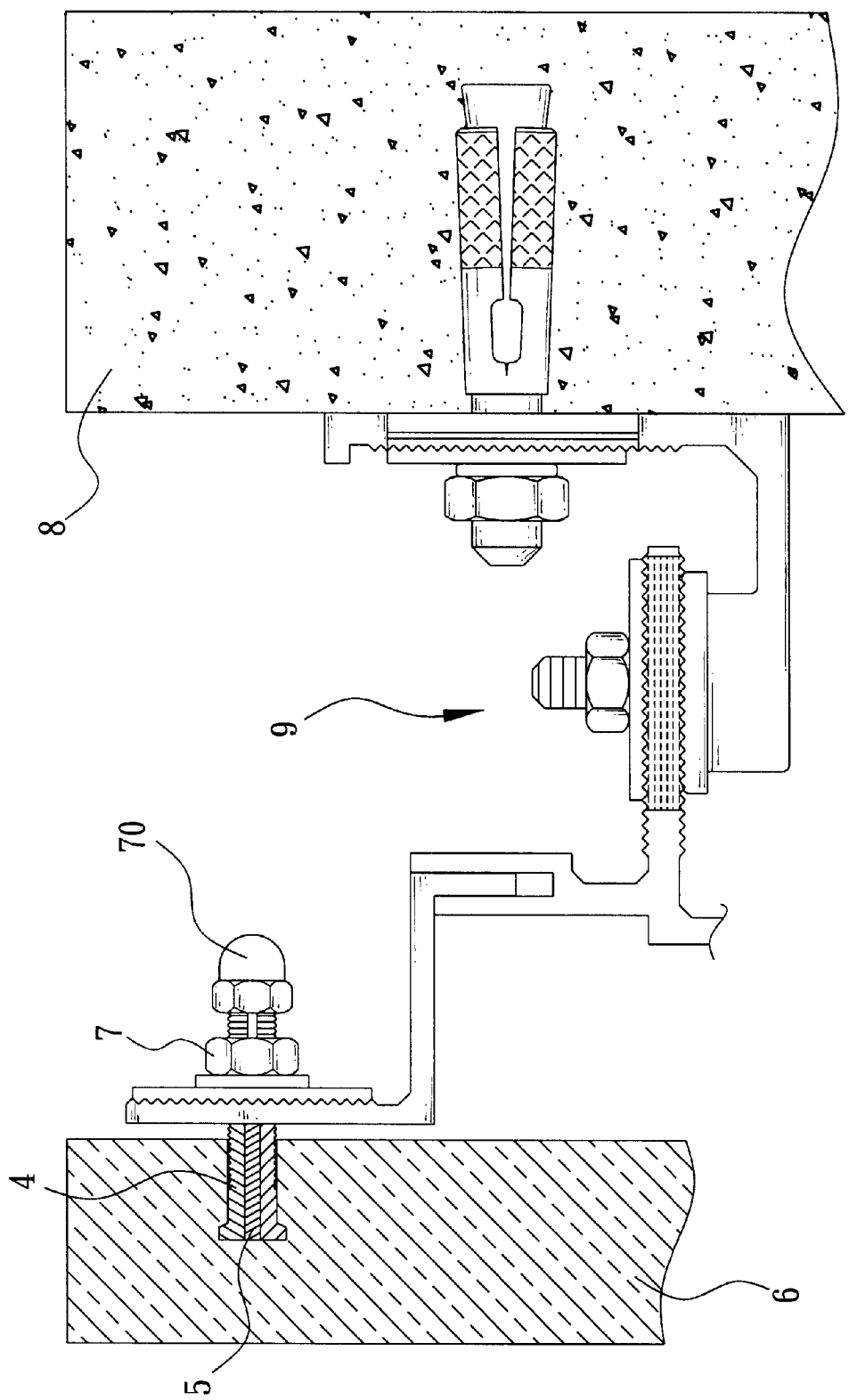
FIG. 7 shows an application example of the present invention wherein the expansion bolt is fastened to an object and supported on a bracket at a support means.

Referring to FIGS. 2 and 3, an expansion bolt shown thereon is comprised of two symmetrical bolt halves 4, and an insert block 5 inserted in between the bolt halves 4. The bolt halves 4 each comprise outer threads 40 on the respective outer side (opposite to the respective inner side that is kept in contact with the insert block 5), so that a nut 7 can be threaded onto the outer threads 40 to secure the bolt halves 4 together with the insert block 5. After the bolt halves 4 have been attached together and inserted into a hole 60 in an object (for example, a stone slab) 6, the insert block 5 is inserted in between the bolt halves 4, and then a nut 7 is threaded onto the rear end of the bolt halves 4 and rotated to move the bolt halves 4 within the hole 60 forwards, causing the front end of the bolt halves 4 against the inner surface of the hole 60 and to be secured to the object 6. Before mounting the expansion bolt in the object 6, as shown in FIG. 7, the bolt halves 4 are inserted through a hole (not shown) on a bracket 9 at a support means 8. After installation of the expansion bolt, the object 6 is secured to the bracket 9 and supported on the support means 8.

Again referring to FIGS. 2 and 3, the bolt halves 4 each have an end notch 44 disposed at the rear end of the inner side. The end notches 44 of the bolt halves 4 form an end hole for the insertion of a tool to stop the bolt halves 4 from rotary motion with the nut 7, i.e., preventing idle running of the nut 7.

Because the insert block 5 is inserted in between the bolt halves 4 but not fixedly connected to the bolt halves 4, the insert block 5 may fall easily from the bolt halves 4, causing the bolt halves 4 to fall from the hole 60. In order to eliminate this problem, a special arrangement is required. According to the embodiment shown in FIGS. 2 and 3, the insert block 5 comprises two recessed holes 54 disposed at two opposite sides thereof, the bolt halves 4 each have a transverse groove 43 disposed at an inner side facing the recessed hole 54 at one side of the insert block 5, two compression springs 56 are respectively installed in the recessed holes 54, and two positioning elements, for example, steel balls 58 are respectively supported on the compression springs 56 and forced out of the recessed holes 54 by the compression springs 56. After insertion of the insert block 5 in between the bolt halves 4, the steel balls 58 are respectively forced outwards by the compression springs 56 into engagement with the transverse grooves 43 of the bolt haves 4. Therefore, the insert block 5 is prohibited from falling out of the bolt halves 4 after insertion of the bolt halves 4 with the insert block 5 into the hole 60 in the object 6.

Figure 4:
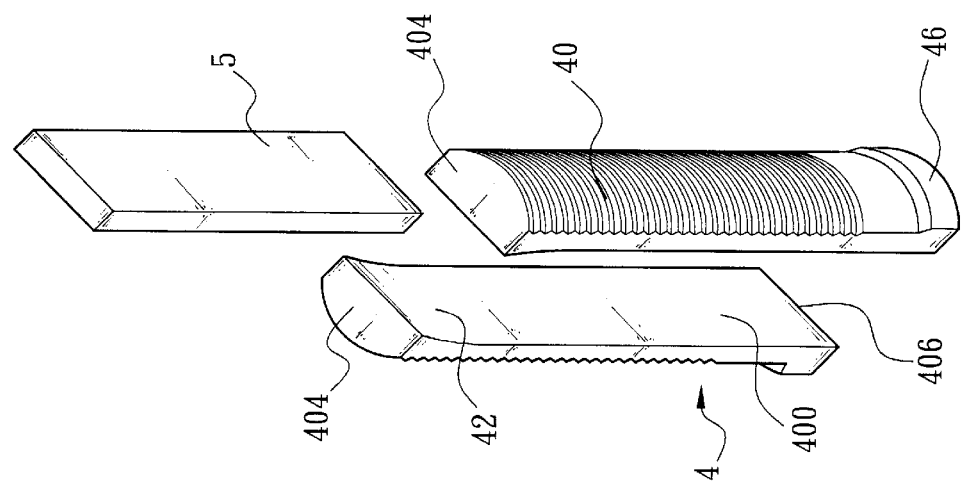
FIG. 4 is an exploded view of an expansion bolt according to a second embodiment of the present invention (the nut excluded).

FIG. 4 shows an alternate form of the present invention. According to this alternate form, the bolt halves 4 each have an inner side 400, outer side 406, front face 404 and rear face 406, and a recessed surface portion 42 at the inner side 400 (opposite to the outer threads 40). The recessed surface portion 42 curves inwards from the respective rear end toward the respective front end and is adapted to receive said insert block. During installation, the bolt halves 4 need to be attached together and the front ends thereof are inserted into a hole in a stone slab, and then the insert block 5 is inserted and sandwiched in between the recessed surface portions 42 of the bolt halves 4, and a nut is then threaded onto the rear ends of the bolt halves 4 and rotated to secure the bolt halves 4 to the stone slab. Thus, the curved recessed surface portions 42 will prevent the insert block 5 from falling out of the bolt halves 4.

Figure 5:
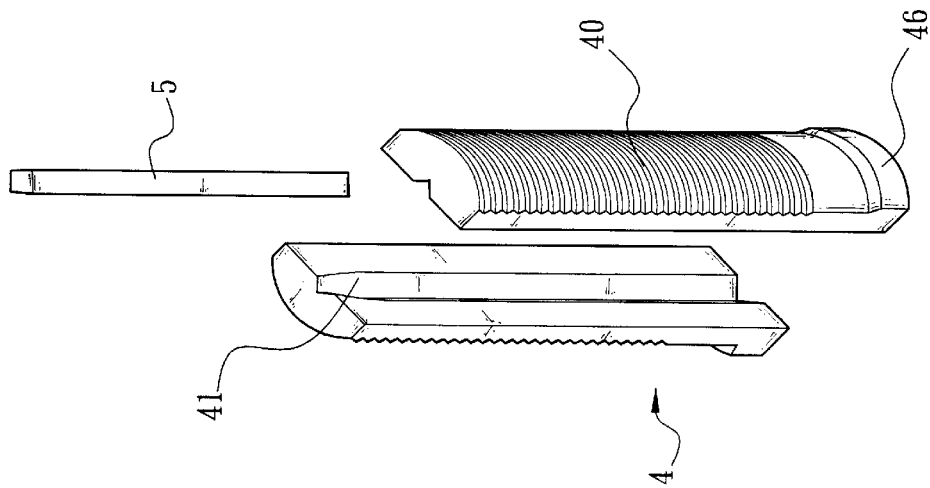
FIG. 5 is an exploded view of an expansion bolt according to a third embodiment of the present invention (the nut excluded).

FIG. 5 shows another alternate form of the present invention. According to this alternate form, the bolt halves 4 each comprise a longitudinal positioning groove 41 extended through the respective rear end to the respective front end of the inner side thereof, wherein the depth of the longitudinal positioning groove 41 curves inwards from the respective rear end toward the respective front end and is adapted to receive said insert block. Therefore, after the front ends of the bolt halves 4 being inserted into a hole in a stone slab and the insert block 5 being inserted into the longitudinal positioning grooves 41 of the bolt halves 4, the curved longitudinal positioning grooves 41 will prohibit the insert block 5 from falling out of the bolt halves 4.

Figure 6:
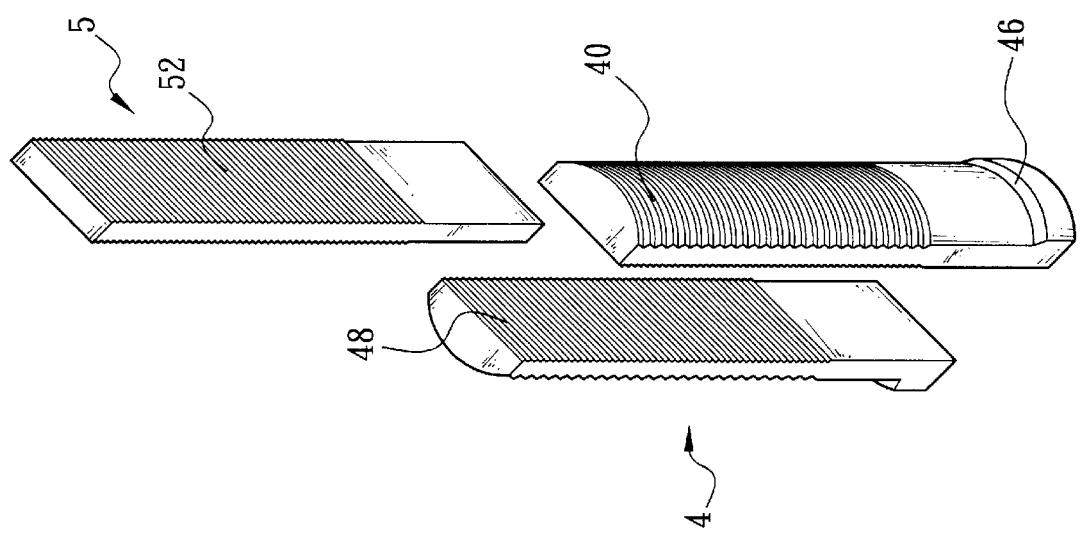
FIG. 6 is an exploded view of an expansion bolt according to a fourth embodiment of the present invention (the nut excluded).

FIG. 6 shows still another alternate form of the present invention. According to this alternate form, the bolt halves 4 each have a toothed surface portion 48 disposed at the inner side thereof, and the insert block 5 has two toothed surface portions 52 disposed at two opposite sides and respectively meshed with the toothed surface portions 48 of the bolt halves 4.

Referring to FIG. 7 again, after installation of the expansion bolt in the object 6 and threading of the nut 7 onto the outer threads 40 of the bolt halves 4, a cap nut 70 is threaded onto the rear end of the expansion bolt outside the object 6 to secure the insert block 5 and the bolt halves 4 together.

Referring to FIGS. from 2 through 6 again, the bolt halves 4 each further comprise a locating flange 46 disposed at the outer side of the front end. After the bolt halves 4 being attached together, the size of the locating flanges 46 of the bolt halves 4 is slightly smaller than the diameter of the hole 60 of the object 6, permitting said front ends of the bolt halves 4 to be inserted into the hole 60. While the insert block 5 being inserted in between the bolt halves 4, the diameter of the expansion bolt then becomes larger than the diameter of the hole 60, and the locating flanges 46 of the bolt halves 4 are thus received in an expanded space 602 inside the hole 60 of the object 6, preventing the expansion bolt from being pulled back out of the hole 60.

As indicated above, after installation of the expansion bolt in the object 6, as shown in FIG. 7, the insert block 5 is positively sandwiched in between the bolt halves 4, causing the bolt halves 4 to be firmly secured to the object 6, so that the object 6 is firmly supported on the support means 8 after connection of the expansion bolt to the bracket 9.

It is to be understood that the drawings are designed for purposes of illustration only, and are not intended for use as a definition of the limits and scope of the invention disclosed.

What the invention claimed is:

1. An expansion bolt adapted to be inserted into an object, said expansion bolt comprising:

a pair of symmetrical bolt halves, each of said bolt halves comprising an inner side, an outer side, a front face, and a rear face;

an internally threaded nut;

outer threads are provided on the outer side of each of said bolt halves, such that when the inner sides of said bolt halves are opposed to one another, the outer threads of the bolt halves receive said internally threaded nut to secure said bolt halves together;

an insert block is secured between the inner sides of said bolt halves prior to attachment of the internally threaded nut, said insert block is shorter than the longitudinal length of said bolt halves; and said bolt halves comprising a securing means that physically blocks said insert block from coming out of said expansion bolt between the front faces of said bolt halves.

2. The expansion bolt as claimed in claim 1, wherein said securing means comprises an outwardly curved surface portion at each of the inner sides of said bolt halves, wherein each of the inner sides of said bolt halves comprises one of said outwardly curved surface portions which blocks escape of said insert block through said curved surfaces.

3. The expansion bolt as claimed in claim 1, further comprising a cap nut threaded on the outer threads of said bolt halves after said internally threaded nut is secured on said bolt halves.

4. The expansion bolt as claimed in claim 1, wherein said bolt halves each comprise a locating flange extending out of the outer side thereof adjacent the rear faces thereof.

* * * * *